United States Patent [19]

Metz

[11] Patent Number: 4,808,219

[45] Date of Patent: Feb. 28, 1989

[54] METHOD FOR TREATING METAL MELTS AND APPARATUS FOR CARRYING OUT THE METHOD

[76] Inventor: Paul Metz, 18 rue J.P. Brasseur, 1258 Luxembourg, Luxembourg

[21] Appl. No.: 59,727

[22] Filed: Jun. 9, 1987

[30] Foreign Application Priority Data

Jun. 12, 1986 [LU] Luxembourg .............................. 86469
Aug. 5, 1986 [LU] Luxembourg .............................. 86541

[51] Int. Cl.$^4$ ............................ C22B 4/00; C21C 5/52
[52] U.S. Cl. ................................... 75/10.14; 75/10.15; 75/10.16; 75/10.66; 75/10.67
[58] Field of Search ................. 75/10.14, 10.15, 10.16, 75/10.66, 10.67, 10.68

[56] References Cited

U.S. PATENT DOCUMENTS

| | | | |
|---|---|---|---|
| 1,946,873 | 2/1934 | Neuhauss ............................ | 75/10.16 |
| 2,139,853 | 12/1938 | Rohn .................................. | 75/10.16 |
| 3,764,296 | 10/1973 | Gerlach ............................. | 75/68 R |
| 3,827,877 | 8/1974 | Pantke ............................... | 75/10.16 |

*Primary Examiner*—Peter D. Rosenberg
*Attorney, Agent, or Firm*—Fishman, Dionne & Cantor

[57] ABSTRACT

A treatment of metal melts comprising the addition of chemically active substances or alloying elements with subsequent mixing taking place as a result of electromagnetic force exerted on the metal melt. The melt, which fills a substantially cylindrical vessel to above its half way mark, is raised to the vertex of the vessel by means of a rotational movement about the substantially horizontal axis of the vessel, and is then allowed to fall back or is conveyed back in the direction of the axis of the vessel to the surface of the melt, on which the chemically active substances or alloying elements have been introduced.

10 Claims, 9 Drawing Sheets

METHOD FOR TREATING METAL MELTS AND APPARATUS FOR CARRYING OUT THE METHOD

BACKGROUND OF THE INVENTION

This invention relates to a method of treating metal melts by the addition thereto of chemically active substances or alloying elements wherein the metal melts are set in motion in a suitable, substantially cylindrical vessel by means of electromagnetic force. This invention further relates to an apparatus for carrying out this method.

Metal melts, in particular iron and steel melts, are conventionally treated by intimate mixing with chemically active media, which are added to the melt in a solid, liquid or gaseous state. For example, pig iron melts are desulphurized or dephosphorized by being mixed with suitable media, e.g. soda or basic oxidizing slags. Steel melts are similarly treated (e.g. for deoxidation or sulphurization), by being mixed with pulverulent substances or slags. Such mixing is usually accomplished in ladles. Alloying elements are also introduced into metals by being intimately mixed therewith. Similarly, chemical reactions can be achieved by intimate mixing of solid substances with metal melts. Thus, for example, coal can be gasified by being introduced into pig iron melts, which are simultaneously or subsequently oxidized. Also, as previously proposed in Luxembourg Pat. No. 81,330, dusts containing zinc or zinc and lead (blast furnace dust) are treated by being blown into a pig iron bath (with or without added carbon). This process both permits separation of lead and zinc, and enables the iron to be recovered in reduced form.

A conventional method of introducing pulverulent or granular substances into metal baths comprises suspending the substances to be introduced in a stream of gas and introducing them onto or into the bath by means of lances. However, it has been found that during this process of blowing, substantial quantities of the substances to be treated are also carried out by the gas stream and are thus lost to the reactions.

It is likewise known to carry out metallurgical reactions such as desiliconization, dephosphorization or desulphurization of pig iron in the tapping spouts of the blast furnaces by blowing in or top-blowing oxidizing or reducing substances.

It is furthermore known that counter-current operations can be carried out with conventional electromagnetic spouts. It has however been found that, in most cases, only an inadequate mixing effect can be achieved with this procedure.

SUMMARY OF THE INVENTION

The above discussed and other problems and deficiencies of the prior art are overcome or alleviated by the method and apparatus for treating melts of the present invention. In accordance with the present invention a method and an apparatus is presented which facilitates the introduction of additive substances and permits better mixing of the melts (with the additives); irrespective of whether the additives are added in solid, liquid or even gaseous form. In accordance with the present invention, the metal melt is delivered to a preferably cylindrical vessel so as to occupy over one half of the vessel. The melt is then induced by electromagnetic force to be raised to the vertex of the vessel by means of a rotational movement about the horizontal axis of the vessel. The melt is then allowed to fall back or is conveyed back in the direction of the axis of the vessel to the surface of the melt on which treatment substances have been introduced.

In accordance with the method of the present invention, intimate thorough mixing is achieved between the metal to be treated and the substances or gases employed to treat the metal. As a result, a substantial acceleration of the desired reactions is achieved, together with simultaneous reduction of temperature losses. The present invention facilitates the introduction of the widest variety of substances to metal baths, particularly if the substances are finely divided ones; which in the present case can be introduced into the metal without loss. Moreover, the method of the present invention leads to a substantial acceleration of the process, such that it is either possible to manage with smaller facilities; or, as in the case of blast furnace spouts, a plurality of reactions such as desiliconization and subsequently dephosphorization or desulphurization can be carried out in the restricted path between blast furnace and ladle.

The method of the present invention differs substantially from the metal treatment methods known in the prior art because of its use of induction. As is well known, in conventional methods, the only objective is a homogenization or relative movement of slag/bath, whereas in the method of the present invention, proper thorough mixing is achieved between the metal bath and the substances or gases employed for treatment.

The method in accordance with the present invention can be carried out both in spouts, which are used, for example, to transport the pig iron between the blast furnace tap and the transport ladles, and in channel-shaped furnaces wherein the length at least corresponds to the diameter of the furnace.

In another embodiment of this invention, furnaces are employed in which a partial quantity of metal is removed from one part of a larger furnace, a short distance below the surface, by means of a spout and flows back again through the same spout to a different part of the furnace or to a different furnace. In this case, the metal to be conveyed between emergence from the furnace into the spout and entry from the spout into the furnace is accomplished by means of separate inductors or by means of the inductors used to create turbulence of the metal. When a large furnace is used, it can be divided by a partitition whereby a connection is provided between the two furnace sections in the lower part of this partition. This combination furnace divided by a partition, may be replaced by two furnaces connected in their lower parts.

The inductor or inductors can exert their movement perpendicularly with respect to the axis of the spout or furnace. If a plurality of inductors arranged in parallel are used, the latter can exert their movement in the same direction of rotation. However, in individual cases, where a plurality of inductors are arranged in parallel, it may be advantageous to actuate their respective movement in opposite directions. This may enable an even more intensive mixing effect to be achieved. These inductors can also be arranged in a preferred manner such that, in addition to conveying the metal around the axis of the spout, they are simultaneously used to convey the metal in a substantially horizontal or rising direction.

In many cases, the apparatus of the present invention may include a preselected inclination for the purpose of accelerating the counter-current reaction. This inclination is dependent on the rate of reaction and should, at least in pilot plants, be adjustable between 0 and 20 degrees. In different treatment stages, it is appropriate to give a plurality of inclinations to a single spout wherein parts of such a spout are to be used in the form of conventional electromagnetic transport spouts. This last mentioned embodiment, which can, for example, be achieved by means of inductors arranged helically about the longitudinal axis, leads to the possibility of carrying out metallurgical reactions in counter-current. As a result, a substantial improvement of the bath/slag reactions on the basis of the equilibrium conditions may be achieved.

The inductors can be arranged rigidly on the treatment apparatus and only be attached to other treatment apparatus after wear of the refractory lining. In many cases, however, it is particularly advantageous to arrange the inductors in such a manner that the treatment vessels can easily be pushed into the inductors, so that many treatments can be carried out with the same inductors. In this case, the treatment apparatus must be made from materials which cause little or no interference with the action of the inductors.

The present invention also contemplates use of mechanical forces to support the intimate mixing effected by inductive forces. This support can be effected, in the case of flow spouts or spouts which connect two furnace sections or furnaces to one another, by a suitable configuration of the refractory lining.

If a plurality of process stages are connected in series, it is necessary to separate the process stages from one another by means of a siphon apparatus, in order to achieve this manner the most complete interim deslagging.

The above discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGS:

FIG. 1A is a cross-sectional elevation view through an open channel type furnace;

FIG. 1B is a cross-sectional elevation view through a closed channel type furnace;

DESCRIPTION OF THE PREFERRED EMBODIMENT

Figure 1:
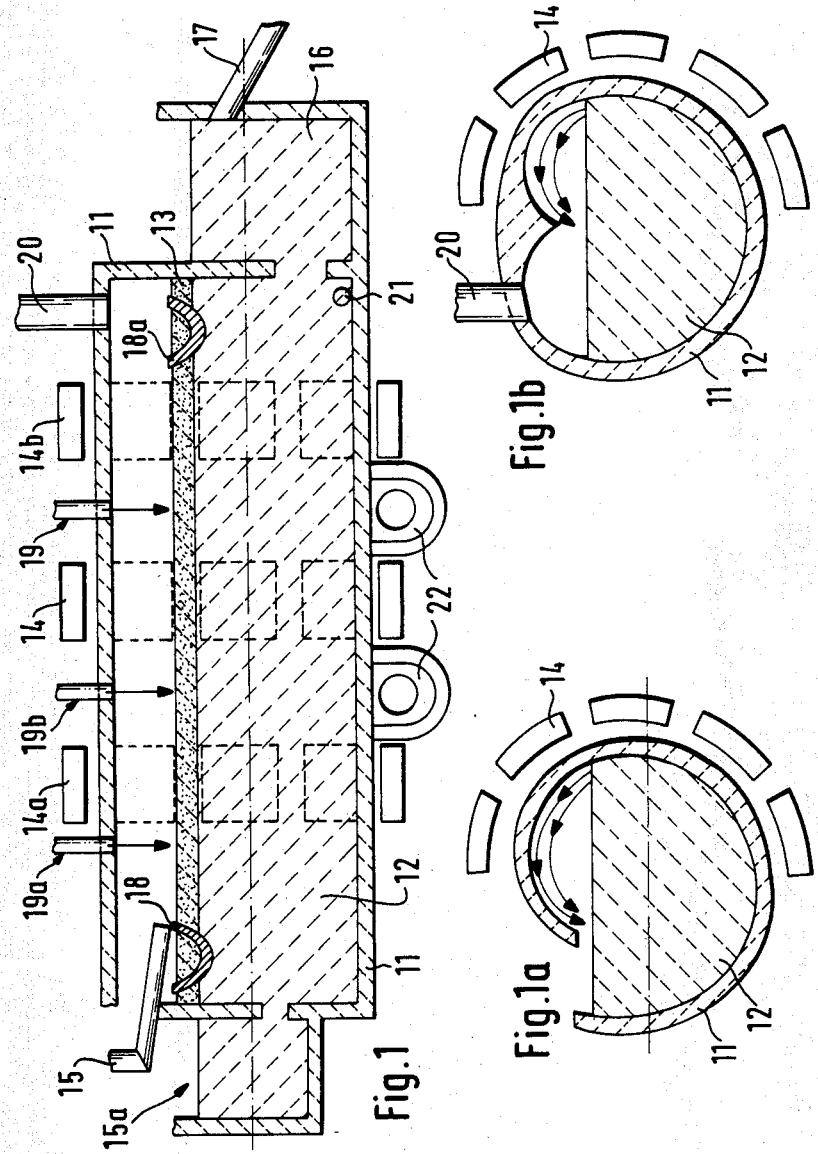
FIG. 1 is a cross sectional elevation view through a channel type furnace in accordance with the present invention.

The furnace shown in FIGS. 1, 1A and 1B include a refractory lining 11 which contains metal 12 and slag 13. One or more inductors, known per se, convey the metal to the vertex of the furnace where, it falls back or is conveyed back onto the metal bath or the slag, and thus results in intimate/metal slag mixing. As shown in FIGS. 1A and 1B, the falling back of the melt may be assisted by a suitable internal configuration of the refractory shell such as indicated by the arrows. The inductor or inductors may be arranged in one sector 14 or may also be distributed over a plurality of sectors 14, 14A and 14B arranged in parallel.

The channel type furnace shown in FIG. 1 is intended for continuous use, for example in a blast furnace tapping spout. The hot metal will flow into the channel type furnace through the spout indicated at 15 and leave the channel type furnace via the spout 17 after passing through the siphon 16. Slag 13 can flow out through the spouts 18 and 18A; the furnace preferably operating in counter-current if spout 18 is exclusively used. The substances or gases employed to treat the metal melt are fed into the furnace through the nozzles and/or lances 19, 19A and 19B.

It will be appreciated from the representation in FIG. 1 that, when a furnace in accordance with the present invention is used, very intimate mixing of bath/slag or reaction gases, and consequently high efficiency, are achieved.

The furnace shown in FIG. 1 is adopted for continuous flow operation. If it is desired to use the same or similar apparatus for discontinuous operation, siphon 16 may be replaced by an apparatus known per se, such as a tap hole, or the furnace may be configured as a rocking furnace.

Figure 2:
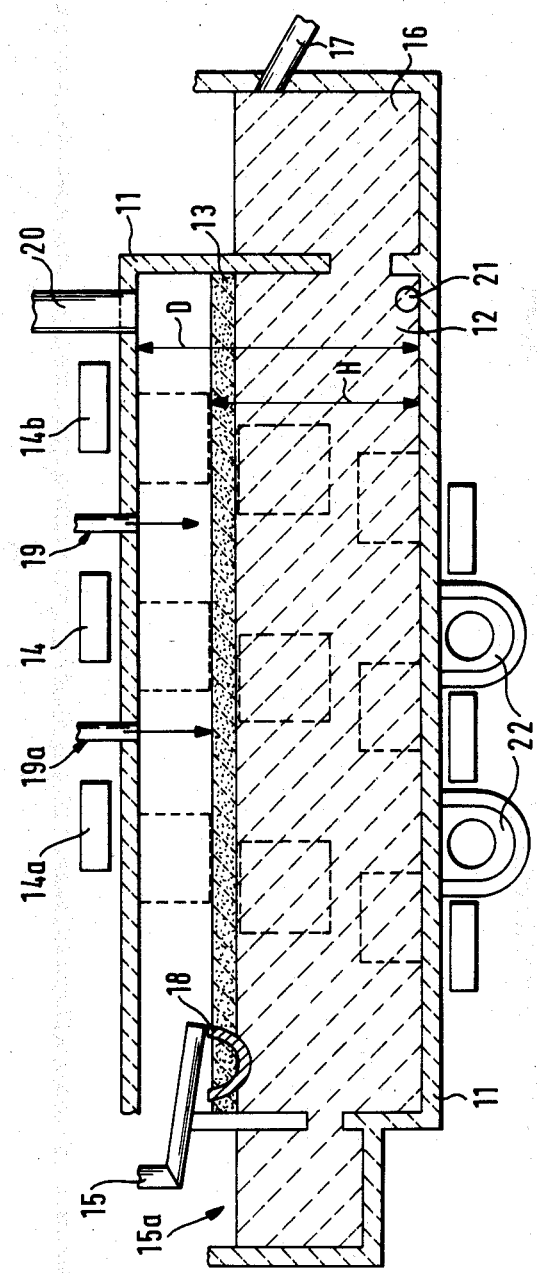
FIG. 2 is cross sectional elevation view of a furnace similar to FIG. 1, but with helically arranged inductors.

In FIG. 2, another furnace is accordance with the present invention for treating metal, particularly for desulphurization is shown. In this embodiment the ladles, which are not completely filled and should have a free space of at least 25 cm between the top surface of the pig iron and the roof of the ladle, can be directly fitted with inductors as shown in FIGS. 1 or 2; or can be introduced into an apparatus which is fitted with such inductors and can move these inductors against the ladle wall. When the inductors begin operation, the pig iron is passed to the vertex, as described previously, and falls onto the bath which is treated with conventional additives such as soda, calcium carbide, lime dust or mixtures of these substances; intensive mixing and reactivity of these substances with the pig iron bath being achieved.

Figure 3:
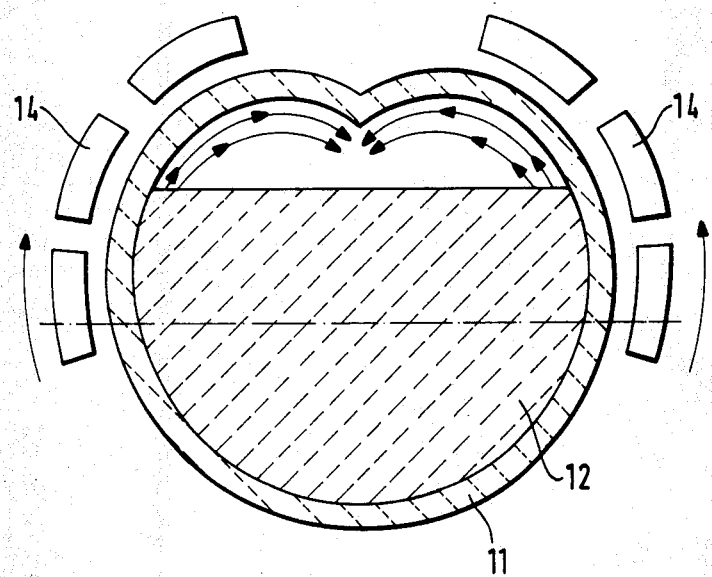
FIG. 3 is a cross-sectional elevation view through a furnace with inductors arranged on both sides.

A further very interesting field of application of the present invention lies in the treatment of foundry pig iron, for the purposes of desulphurization or alloying, in the forehearths of the cupola furnaces, the transport or alloying ladles or in the foundry transport vessels which are used to distribute the pig iron into the casting molds. In these applications, the alloying agents or inoculants can be intensively mixed with pig iron before or after the filling of the ladles. The ladle, which is configured as a channel type furnace is fitted with inductors or, as previously described in the case of the torpedo ladles, are introduced for a few minutes to an inductor stand and they are intimately mixed with the alloying and inoculating elements. In this embodiment of the present invention, as shown in FIG. 3, the inductors may be disposed at both sides of the ladle and may operate in opposite directions, in order to achieve in this manner an even more rapid and intensive mixing.

The present invention is particularly important in the elimination of metal-containing waste products, particularly those waste products formed in the production of steel or the incineration of refuse. These waste products are present in the form of finely divided dusts, which can be treated only with great difficulty. It is known that these dusts, as previously described in aforementioned Luxembourg Pat. No. 81,330, can be blown into a pig iron bath. However, this method if difficult to use since the finely divided substances are partly entrained by the conveying gases and carried out again. The method of the present invention permits intimate contact between pig iron and metal containing waste products, without the use of conveying gas. For this purpose the furnaces described in FIGS. 1 and 1B or 2 can be employed with charging nozzle 15 being omitted and the furnace being closed. Charging then takes place via the siphon 5A. In this case, the furnace is supplied with a degassing nozzle 20.

The method of the present invention can be carried out both by the flow process, e.g. in the pig iron spout, and as a pure treatment process. When the method is applied as a flow process, the pig iron is introduced into the channel type furnace through the siphon 15A; the waste products to be treated being introduced into the system through the nozzles 19, 19A, and 19B. Intimate mixing is caused in the system by the actions of the inductors, all the metals being reduced, and some of them escaping in vapor form through the nozzles 20 while others, e.g. in the case of lead, accumulate in the pig iron. After leaving nozzle 20, the metals in vapor form are condensed as metal or precipitated in standard filter units after oxidation. The iron oxides contained in the waste products are likewise reduced and leave the system with the pig iron through the siphon 16 and the discharge spout 17. Lead is released at regular intervals through the tap 21. The slag leaves the system through the tap 18 or 18A.

If the channel type furnace is used as a pure treatment furnace, the pig iron is introduced only until the furnace is full, and the treatment can then begin (e.g. with waste products being introduced). The treatment is identical with that described previously, with the exception that the pig iron should be adjusted to a constant value by optional introduction of carbon with the waste products; and the temperature should be maintained by means of suitable heating systems, e.g., by means of the channel inductor or inductors 22. The mixing inductors can also include means such that they simultaneously act as heating inductors.

One of the most important features of the present invention, shared in common with all embodiments, is that the metal melt is raised by inductive rotation approximately to the vertex of the cylindrical vessel or furnace wall and then falls back or is conveyed back onto the metal bath. This creates double turbulence in the metal melt, which promotes vigorous mixing.

The level to which the vessel is filled plays an essential role with respect to the efficiency, i.e. the most vigorous turbulence possible combined with the minimum possible expenditure of energy. If the filling level is designated H and the furnace diameter D, the optimum efficiency is achieved when the level of filling $O=H/D$ lies between 0.75 and 0.90.

Figure 4:
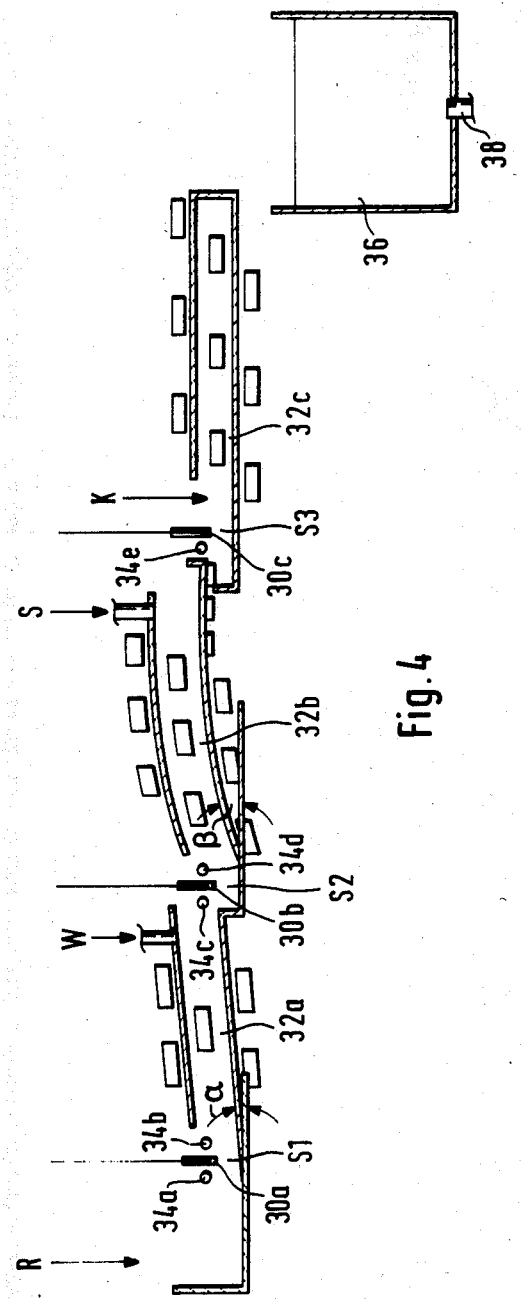
FIG. 4 is a diagrammatic view of a channel installation with a plurality of treatment stages.

FIG. 4 shows the diagram of a channel unit which simultaneously desiliconizes, dephosphorizes and desulphurizes. It comprises three siphons S1, S2 and S3 with three siphon walls 30A, 30B and 30C, and three mixing sections 32A, 32B, and 32C. A unit of this type can be employed in the blast furnace spout between blast furnace and transport ladle. This unit can also be employed as an intermediate member between the torpedo ladle and the steel works ladle. The pig iron R is, for example, tipped from a pig iron ladle, into the first siphon apparatus whereupon the slag can flow down through the aperture 34A. After passing siphon wall 30A, the pig iron comes under the influence of a first electromagnetic mixing apparatus 32A of the type contemplated by the present invention and, because of a helical arrangement of the inductors, is conveyed at a slope $+5°$ into the siphon apparatus S2. Before this siphon is reached, preheated roll scale with fluxes W is charged, and this flow back in counter current towards the siphon S1 and largely desiliconizes the pig iron. This section has either an acid lining or a high alumina lining. The slag of high silica content is deposited through the aperture 34B. The pig iron falls into siphon S2, where silicon containing slag residues flow down through the aperture 34C. After the siphon has been passed, dephosphorization takes place in the next electromagnetic mixing apparatus 32, which has a curved form. The lower part of this unit, in the region of the siphon S2, has an inclination $\beta=7°$ to the horizontal, and flattens out to 2° at the top end, where the helically arranged mixing inductors give way to linear conveying inductors arranged at the bottom and/or above the slightly inclined apparatus.

This arrangement has been selected in order to give the soda S (which in this example has been added as a dephosphorization agent), the opportunity to liquefy before it is conveyed in counter current to S2, where it reacts completely and can be discharged through the aperture 34D. The dephosphorization reaction is assisted in the mixing apparatus by the introduction of oxygen or oxygen containing gases (not shown). After it has been substantially dephosphorized, the treated pig iron flows into the siphon apparatus S3, where residual traces of slag can flow out through the aperture 34E. After passing siphon S3, the pig iron enters the electromagnetic mixer unit 32C, which is horizontal or inclined slightly downwards in the downstream direction (1° to 3°). In unit 32C, calcium carbide K is added directly behind the siphon wall 30C.

After leaving apparatus 32C, the pig iron, with its desulphurization slag, flows into a ladle 36 where a further desulphurization, supported by flushing gas 38, can take place if necessary. The principal purpose of this operation is however to protect the pig iron, by means of the desulphurizing slag layer, against radiation losses. In the case where it might be desirable also to skim off the desulphurization slag automatically, the electromagnetic mixing unit 32C would be inclined by about 7°, the calcium carbide added just before the discharge end, and the slag allowed to run out in an overflow to be fitted in siphon S3. The desulphurization effect can be supported in unit 32C by injecting small quantities of reducing gases. Preferably, units 32B and 32C are provided with a basic lining.

It has also been found that the action of the electromagnetic force which produces the rotational movement of the melt in accordance with the present invention, can be substantially increased by passing an electric current through the axis of the metal bath to be moved. This current is preferably introduced into the metal bath by electrodes (not shown) positioned upstream and downstream of the point to be moved. The current can be alternating current or direct current, but the maximum efficiency is achieved with direct current.

In addition, it has been found that changing the supply of current to the inductors by superimposing pulsed currents on the normal current supply, or by means of brief frequency changes, substantially increases the mixing effect.

The method of the present invention not only relates to relatively elongated furnaces but also to other furnaces or ladles in which only partial quantities are in each case removed and returned to the furnace; or furnaces which are operated jointly in a continuous operation. These apparatuses and methods, which relate both to the treatment of partial quantities and to the use of a plurality of connected furnaces, are described in detail below.

Figure 5B:
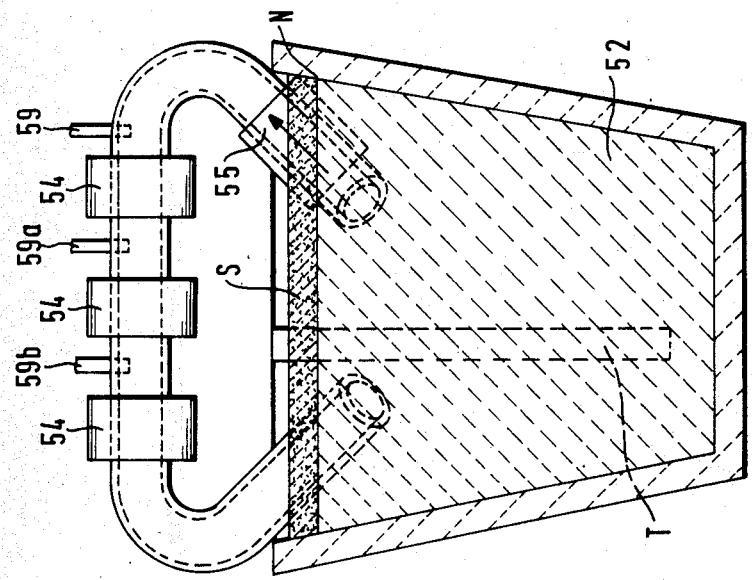
FIGS. 5A, 5B and 5C are a plan view and two side views, respectively, partly in cross-section, of a unit for treating part-quantities of a metal melt.
Figure 5A:
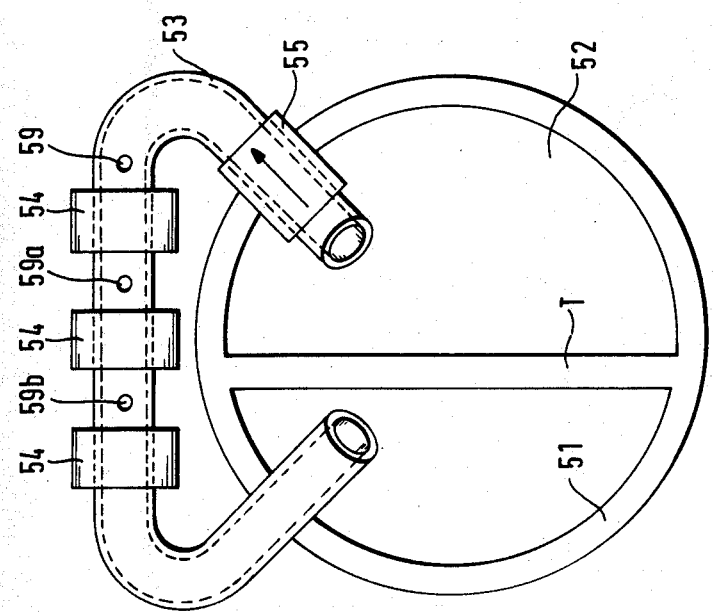
Figure 5C:
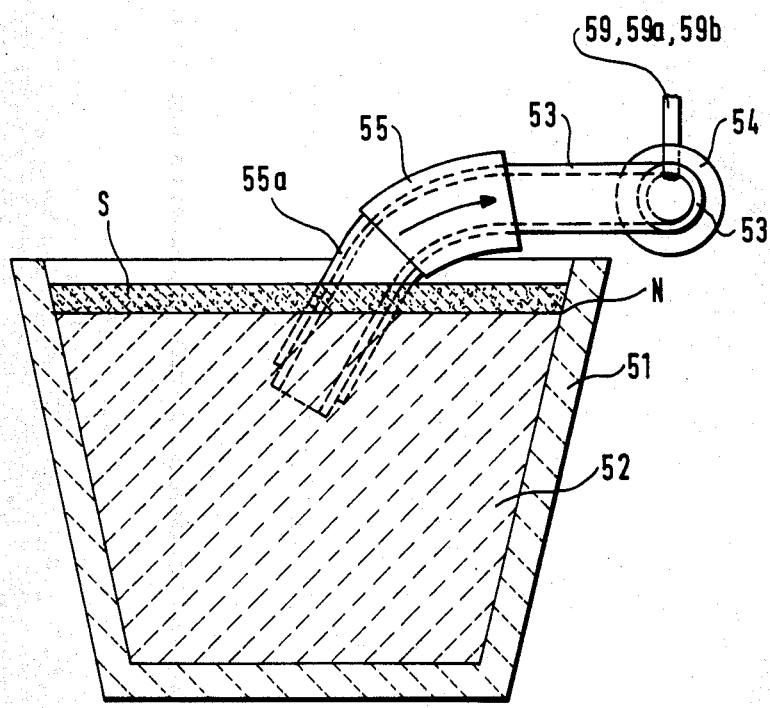

In connection with a possible unit for treating partial quantities, reference is made to FIG. 5A, which shows a plan view, FIG. 5B, which shows a front elevation, and FIG. 5C, which combines a sectional view with a side view. In these three FIGURES, the ladle or furnace 52, lined with refractory material, contains the metal 52, which fills the ladle to the level N. A film or layer of slag S normally floats on the metal bath.

If it is desired to treat metal 52 (for example, by adding desulphurization agents as is frequently done in the case of steel and pig iron), an apparatus 53 is introduced into the metal bath. Usually, it is necessary to ensure that the slag does not enter apparatus 53. After the inlet (and possible the outlet) of apparatus 53 have been introduced into the bath, apparatus 53 is filled with metal. This filling can be effected by switching on the inductor or inductors 55, which are configured so as to exercise a pumping action on the metal bath, and thus convey the metal into the mixing section which is provided with the treatment inductors 54.

The method of operation of inductors 54 corresponds to that which has already been described, the inductors in this case preferably being of a configuration such that they convey the metal from right to left as shown in the FIGURES. They may also be configured in a manner such that they exert a heating effect in addition to the mixing and conveying action. At the moment when the metal reaches the inductors 54 and is caused to adopt an intimate mixing movement by these inductors, the solid or liquid substances or gases needed for the treatment can be fed to the metal bath through the apertures or nozzles 59, 59A and 59B and intimately mixed with the bath. If it is desired to separate the treated quantity from the untreated, the ladle can be provided with a partition T which is open at the bottom (see FIG. 5B).

A similar apparatus to that described in FIGS. 5A–C would be one in which the mixing section, provided with the inductors, was connected directly (i.e. without the ascending section provided with the lifting inductor 55), with at least one or two apertures made in the ladle and provided with slide closures. Such a construction would lead to similar results as that previously described. An apparatus of this kind leads to very favorable results if used with tilting ladles, particularly with torpedo ladles. In these cases, the mixing apparatus can readily be filled simply by tilting the ladle. Filling can be achieved by overflow into the ladles through a normal aperture, given an adequate pumping and lifting action by inductors 54.

The mixing section described above (e.g. with direct contact with the metal, in other words with no lifting inductor), could be fitted to the apparatus for treating metal melts before casting as described in European Patent Application No. 83,630,074. It will be appreciated that the heating described in this patent application may be combined with simultaneous treatment of the metal in accordance with the present invention.

Turning again to FIGS. 5A, 5B and 5C, an apparatus is shown in which the metal to be treated is conveyed by a magnetic pumping effect from a ladle into the mixing apparatus of the present invention. The magentic pumping effect can be assisted or replaced by other known means. For example, as described below with reference to an example for torpedo ladles, the magnetic pumping effect can be assisted or replaced by superatmospheric pressure in the ladle, a gas lift effect or a vacuum. It will be appreciated that the four means mentioned (i.e. superatmospheric pressure in the ladle, gas lift effect, vacuum and electro-inductive pumping) may be employed alone or in any combination.

Figure 6:
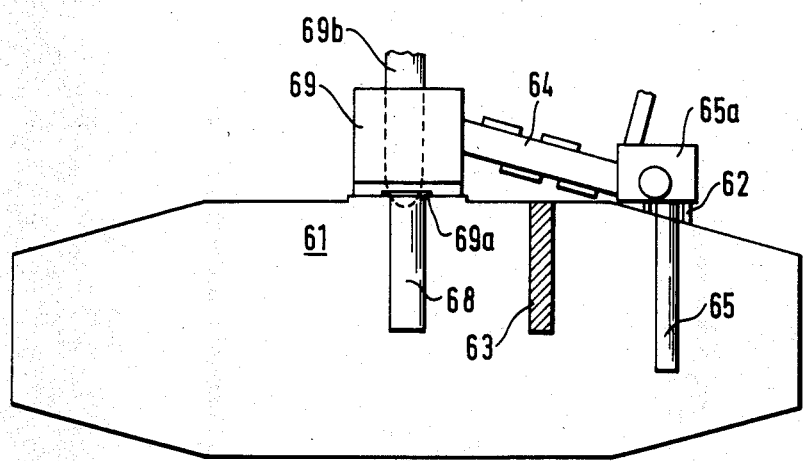
FIGS. 6 and 6A are a cross sectional view and a plan view, respectively, of a unit for a torpedo ladle.
Figure 6A:
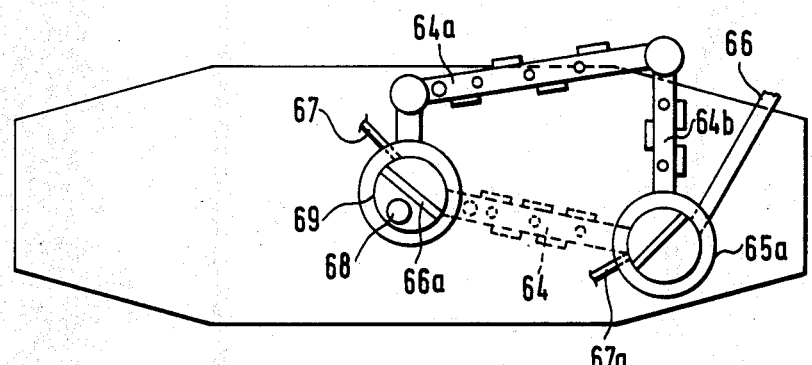

FIGS. 6 and 6A describe a unit of this kind in association with torpedo ladles identified at 61. In this unit 61, the desired operations such as desiliconization, desulphurization and desphosphorization can be carried out in succession. In addition to its normal runner gate, torpedo ladle 61 possesses a second aperture 62. Both apertures may be sealed off, preferably in a gastight manner. If this is not possible, a partition 63 is provided which reaches to the approximate center of the torpedo ladle.

The apparatus of the FIG. 6 embodiment further includes a riser 65, which projects inwards to a point slightly above the bottom of the torpedo ladle and is preferably provided with a gas lift unit. The upper part of riser 65 can be provided with a suction line 66. The electro-magnetic pump shown in FIG. 5 can similarly be incorporated in riser 65. The torpedo ladle itself can be subjected to a slight superatmospheric pressure, such that the pig iron fills the pipe 65 and passes into the mixing sections 64 or 64A and 64B. If the torpedo ladle cannot be easily sealed off at its inlet, it is sufficient, after installing partition 63, to place only the right hand part of the torpedo ladle under superatmospheric pressure. The filling apparatus 69 connected with the complete system is introduced into the normal inlet connector of torpedo ladle 61. This apparatus comprises a siphon vessel with a partition, a ladle inlet connector 68, and a slag overflow 67. The connector 68 can be sealed at the start of operation with a fusion plate 69A or with a plug 69B.

Electromagnetic mixing section 64 can lead directly from 65A to 69, as shown in FIG. 6 and in broken lines in FIG. 6A. In order to achieve a longer mixing path, however, the mixing section can also reach 69 from 65 via the detour 64A and 64B. The mode of operation of the system introduced as a whole into the torpedo ladle by means of a raising and lowering apparatus is readily apparent from FIG. 6 and from the description which follows.

The pig iron to be treated is raised via pipe 65, by means of one or more of the four methods described above, to 65A, where it is then continuously conveyed, via the mixing sections 64 or 64A and with the addition of the conventional treating substances or gases, into the siphon member 69 which, after filling and fusion of 69A or raising of 69B, allows the pig iron to flow back after treatment into the torpedo ladle via 68.

The slag formed during the treatment automatically flows away via the overflow 67, so that the treatments, such as desulphurization, desiliconization and dephosphorization, can be carried out successively without any problems.

If mixing sections 64 or 64A and 64B have an adequate slope, e.g. in excess of 2°, in a manner such that the slag is not entrained with the flow of metal, it is possible to work in counter-current, the function of the additives being performed at the respective ends of the mixing sections and the slag running out via the overflow 67A from the connector 65A configured as a siphon.

It will be appreciated that the unit fitted to the right hand side of the ladle may be fitted symmetrically to the left hand side of the ladle, in which case the two units can work together, making use of the same siphon apparatus 69.

As indicated in FIGS. 6 and 6A, in individual torpedo ladles, the connector 62 may be fitted in the conical section, such that it is automatically filled with metal when the torpedo ladle tilts backwardly, this metal then being guided via 65A into the mixing apparatus, and then being able to run on as described. In this case, the four examples of lifting means described earlier can be circumvented. The just described apparatus could similarly be used in normal ladles containing pig iron, steel or other metals.

It will be appreciated that a very wide variety of metallurgical operations become possible with the use of the apparatuses described in FIGS. 5A, 5B, 5C and 6. Thus, in the case of pig iron, the desired operations such as desiliconization, dephosphorization and desulphurization can preferably be carried out successively in the same ladle, such as for example torpedo ladles, using the same apparatus with means which are known per se. The individual operations are favored by the automatic intermediate removal of slag. Operations such as the treatment of zinc and lead containing waste products with pig iron, described with referecne to FIG. 1, can likewise be performed in the units described in FIGS. 5 and 6.

Steel baths can also be treated with conventional agents, in the manner described and with the apparatus described in FIGS. 5 and 6. This treatment can occur in the production furnace itself or in the casting ladle or tundish. Thus, for example, steel baths can readily be alloyed using pulverulent alloying elements; or can be desulphurized or deoxidized with conventional treatment slags, such as solid or liquid Perrin slags.

The same apparatus can be employed for rapidly heating steel melts by means of the thermite process. This process, which combines rapid heating of the bath with a treatment effect of the slag produced at the same time, has been described in Luxembourg Pat. No. 84,272. The reaction described in this process can be combined with the apparatus of the present invention such as described in FIGS. 5A, 5B, or 5C. For example, aluminum may be added through the nozzle 59 with the oxygen subsequently needed being introduced through the nozzles 59A and 59B. The intimate mixing of the treated steel with aluminum and the oxygen introduced subsequently (using the apparatus of the present invention), results in a very rapid heating effect combined with a simultaneous purifying effect resulting from the slag produced during the reaction.

In complex reactions, such as in the case of the gasification of coal in a pig iron bath with simultaneous desulphurization, direct reduction with simultaneous production of pig iron, or the processes used in non-ferrous metallurgy, it is preferable to use the method or the apparatus of the present invention as an interim stage between two or more furnaces operating in combination. This embodiment of the present invention, entailing great advantages, is described in detail with reference to the two examples which follow.

Figure 7:
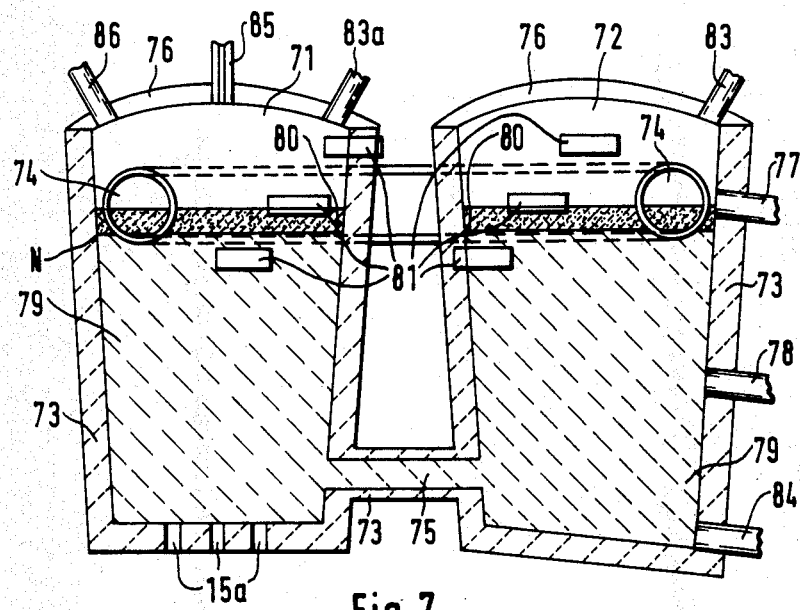
FIG. 7 is a vertical cross section of a first embodiment of a coal gasification plant.
Figure 7A:
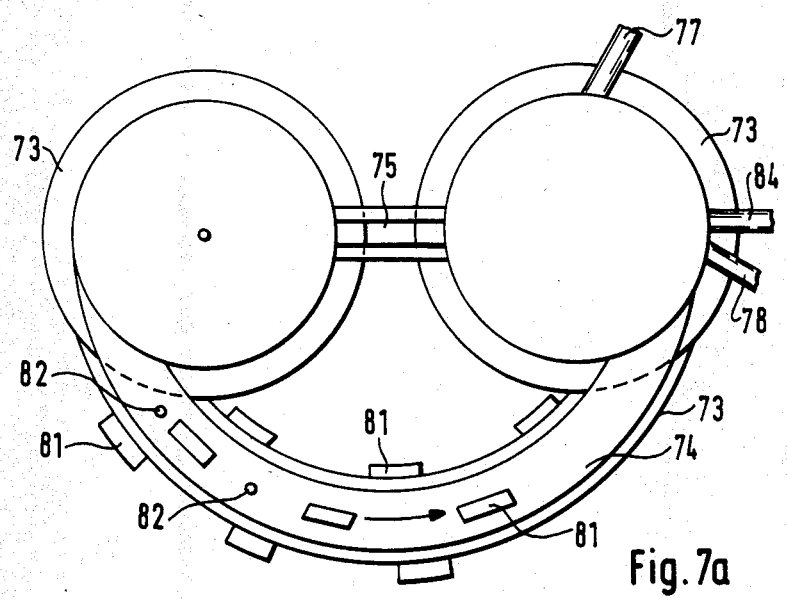
FIG. 7A is a plan view of the coal gasification plant of FIG. 7.

The first example is shown in FIGS. 7 and 7A and relates to a coal gasification plant for coal of relatively low sulphur content. In principle, the plant consists of two vessels 71 and 72, which are connected in their upper part by a mixing section 74. A pipe 75 connects the two vessels in their lower part. The plant as a whole is provided with a refractory lining 73. The plant is sealed by means of the covers 76 in a manner such that it can also operate under pressure.

The vessel of FIG. 7 is equipped with a lance 85, which top blows oxygen, with or without powdered limestone, onto the pig iron bath designated 89. The oxygen, with or without added limestone, can also be supplied to the pig iron bath 79 through bottom jets 85A. Jets 85A can be configured as oil cooled or gas cooled annular gap jets.

As a result of this oxygen feed, the gas is formed by combustion of the carbon contained in the pig iron. The heat thus generated can be controlled by the addition of steam to the oxygen blown-in. The heat formed in this process can also be used to melt down scrap or prereduced ores which are introduced into vessel 71 through the aperture 86. The gases produced can, moreover, be used wholly or in part for the prereduction of ores.

The heart of the plant is the upper connecting channel 74, which is configured as an electro-inductive mixing apparatus as described in relation to FIG. 1. This channel, which should be comprised of a magnetically permeable shell, such as, for example, a nonmagnetic steel, or preferably of a nonmagnetic composite material, has an internal lining of a highly refractory and abrasion-resistant material. Channel 74 is preferably configured such that the metal 79 is conveyed from 71 to 72. Channel 74 possesses the charging connectors 82 through which the carbon is introduced into the system.

As shown in the FIGURES, channel 74 can be positioned in furnace 71 in a manner such that the slag (in this case a desulphurization slag, which consists principally of limestone, possibly with added fluorspar), is conveyed from 71 to 72. In this manner, the coal introduced through 82 is immediately brought into contact with the premelted desulphurization slag and the pig iron, such that the pig iron is not only carburized by the carbon, but is simultaneously desulphurized.

Following this procedure, the volatile constituents of the coal can be taken off separately together with the valuable tars as rich coal gas via the gas line 83, the gas formed in 71 by the injection of oxygen/steam being taken off via 83A. If clear cut separation of the gases is desired, the connecting and mixing pipe 74 must be introduced into the vessel 71 below the bath level. In this case, however, it is necessary to dispense with the liquid slag desulphurization effect and to introduce the desulphurization agents with the coal.

If it is desired to obtain only a mixed gas, the off-gas line 83 is closed and all the gases are taken off via 83A. The tars are then cracked in the hot gas space above the bath 79 in the vessel 71. Slags 80 leave the system via an outlet 77, possibly together with a slight surplus of pig iron. If cooling takes place by means of scrap or prereduced ore, the pig iron formed from these substances is tapped off through the tap holes 78 or 84. Since pig iron is continuously conveyed from 71 to 72 through the mixing channel 74, and flows back to the vessel 71 via the connecting pipes 75, the plant works continuously.

The plant shown in FIGS. 7 and 7A can be employed for a very wide variety of metallurgical operations. For example, this plant can be used for the treatment of lead and zinc containing metallurgical wastes, as already described; electrical heating in this plant being replaced by the combustion of carbon by means of oxygen. In this case, the connector of the mixing and conveying channel 74 is placed in the vessel below the bath level N, and the substances to be treated, with or without added carbon, are introduced through 82. The lead and zinc containing gases leave the system through the connector 83. The temperature is controlled by injecting minor amounts of oxygen through the lance 85 and/or through the bottom nozzles 85A. The slag, possibly with pig iron, leaves vessel 72 via the overflow 77. Pig iron can be taken off via the outlet 78 or together with lead via the outlet 84.

Figure 8:
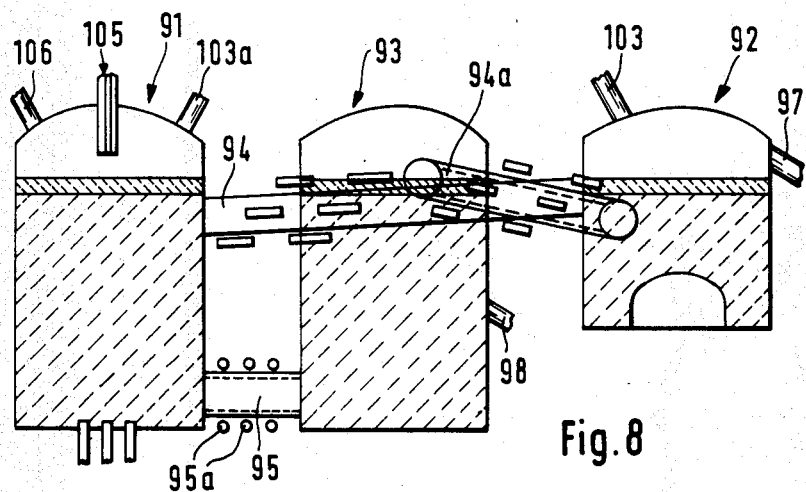
FIG. 8 is a vertical cross sectional view of a second embodiment of a coal gasification plant.
Figure 8B:
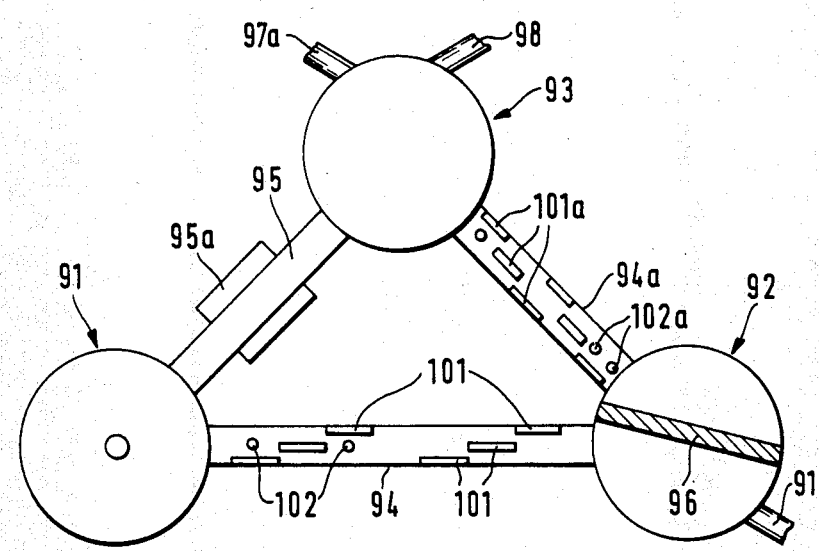
FIG. 8A is a plan view of the coal gasification plant of FIG. 8.

FIGS. 8 and 8B represent diagrammatically a plant with three vessels and two mixing sections. This plant permits more complex treatments such as gasification of coal of relatively high sulphur content and simultaneous production of cement.

As in the preceding example, coal is gasified in a vessel 91, with oxygen with or without steam. In the mixing section 94, the carbon is introduced with powdered limestone through the connectors 102 and is intensively mixed with the pig iron by means of the described action of the inductors 101. The addition of limestone is calculated to combine with the coal ash to produce a composition which is suitable for the production of cement. The slag thus formed is separated off via a spout 97, a siphon wall 96 interrupted at the bottom optionally preventing this slag from being entrained into the mixing section 94A.

The main desulphurization operation takes place in this mixing section 94A, known desuphurizizing agents such as soda or limestone/fluorspar mixtures being introduced through the nozzles 102A and being intimately mixed with the pig iron by the action of the inductors 101A. The desulphurization slag formed is separated off via 97A, the pig iron flowing back into the vessel 91 via 95. The quantity flowing back can be controlled by means of solenoid pumping valve 95A. The gases formed and the pig iron are removed from the system as described with reference to FIG. 6.

In the case of even more complex metal treatments, such as are customary in non-ferrous metallurgy, the number of vessels and inductive mixing channels can be increased as required. As shown in FIG. 8B, these channels are designed as straight pipes, which makes it much easier to brickline the channels in comparison to the embodiment shown in FIG. 7A. The arcuate channel shown in FIG. 7A could successfully be replaced by a straight channel.

It will be appreciated that the present invention also contemplates the supply of additional energy, for example in the form of electrical energy, by means of induction coils or arcs or through the treatment inductors themselves, for example when high ash coal is used.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for treating a metal melt by the addition of chemically active substances or alloying elements, the metal melt residing in a vessel having an apex and having a longitudinal axis which is substantially horizontal or inclined from the horizontal including the step of:
   filling said vessel above one half full with said melt to be treated;
   rotating said melt less than 360 degrees about said longitudinal axis of said vessel using electromagnetic force to thereby raise said melt to the apex of said vessel;
   causing said melt to fall back from the apex in the direction of said longitudinal axis of said vessel onto the surface of said melt while the melt is contemporaneously being raised to the apex of said vessel; and
   adding substances to said melt.

2. Method according to claim 1 wherein:
   the degree of filling $0=H/D$ of the vessel is between 0.75 and 0.90 where H and D are the filling level of the melt and the diameter of the vessel, respectively.

3. Method according to claim 1 including:
   moving said melt in a uniform direction of rotation along the entire length of said vessel.

4. Method according to claim 1 including:
   providing at least two zones along the length of said vessel, said melt being moved in respectively opposed directions in said zones.

5. Method according to claim 1 including:
   using mechanical forces for providing the inductively effected mixing.

6. Method according to claim 1 including:
   providing an additional axial movement to said metal melt by means of said electromagnetic force with which the rotational movement is produced and thereby forming a mixing section.

7. Method according to claim 6 wherein said mixing section is formed by the steps of:
   giving the vessel an inclination which ascends in the direction of the flow wherein a counter current is produced between the rising metal melt and the falling added substances by introducing the substances at the end of the mixing section.

8. Method according to claim 6 including:
   passing electrical current through the melt in the region of the mixing section.

9. Method according to claim 6 including:
   removing a partial quantity of melt from one metallurgical vessel;
   treating said partial quantity in at least one mixing section; and
   conveying back said treated partial quantity into said vessel.

10. Method according to claim 6 including:
    removing a partial quantity from one metallurgical vessel;
    treating said partial quantity in said mixing section; and
    conveying said partial quantity into a second vessel.

* * * * *